(12) United States Patent
Song et al.

(10) Patent No.: US 8,163,442 B2
(45) Date of Patent: Apr. 24, 2012

(54) METHOD FOR MANUFACTURING CATALYST-COATED MEMBRANE USING MASK

(75) Inventors: Seong Min Song, Seoul (KR); Jin Nam Park, Seoul (KR); Sung Eun Kim, Seoul (KR); Sang Woo Lee, Daegu (KR)

(73) Assignee: LG Chem, Ltd., Seoul (KR)

( * ) Notice: Subject to any disclaimer, the term of this patent is extended or adjusted under 35 U.S.C. 154(b) by 1043 days.

(21) Appl. No.: 11/546,359

(22) Filed: Oct. 12, 2006

(65) Prior Publication Data

US 2007/0087259 A1    Apr. 19, 2007

(30) Foreign Application Priority Data

Oct. 14, 2005   (KR) .................... 10-2005-0096800
Oct. 14, 2005   (KR) .................... 10-2005-0096804

(51) Int. Cl.
*H01M 8/00* (2006.01)
*H01M 4/86* (2006.01)
*H01M 4/02* (2006.01)
*H01M 4/88* (2006.01)
*B05D 5/12* (2006.01)

(52) U.S. Cl. ........ 429/535; 429/531; 429/529; 429/523; 427/115; 502/101

(58) Field of Classification Search .............. 430/5; 429/523–535; 427/115; 502/101
See application file for complete search history.

(56) References Cited

U.S. PATENT DOCUMENTS

| | | | |
|---|---|---|---|
| 2003/0224233 A1 | 12/2003 | Kohler et al. | |
| 2004/0081749 A1 | 4/2004 | O'Brien | |
| 2004/0091767 A1 | 5/2004 | Zuber et al. | |
| 2005/0026026 A1* | 2/2005 | Yen et al. | 429/36 |
| 2005/0271929 A1* | 12/2005 | Sompalli et al. | 429/40 |
| 2006/0003177 A1* | 1/2006 | Smith et al. | 428/500 |

FOREIGN PATENT DOCUMENTS

| | | |
|---|---|---|
| EP | 1 403 949 | 3/2004 |
| JP | 2000-294257 | 10/2000 |
| TW | 553496 | 9/2003 |
| TW | 555166 | 9/2003 |
| WO | WO 00/10216 A1 | 2/2000 |
| WO | WO 2005/015667 | 2/2005 |
| WO | WO 2005015667 A2 * | 2/2005 |

* cited by examiner

*Primary Examiner* — Karie O'Neill Apicella
(74) *Attorney, Agent, or Firm* — McKenna Long & Aldridge LLP

(57) ABSTRACT

Disclosed are a method for manufacturing a catalyst-coated membrane, the catalyst-coated membrane manufactured by the method, and a fuel cell including the catalyst-coated membrane manufactured by the method. The method includes the steps of: (a) providing a mask including a masking film layer and a first adhesive layer laminated on the masking film layer, and having patterns in which portions corresponding to the portions of an electrolyte membrane to be coated with catalyst are removed; (b) attaching the mask on one surface or both surfaces of the electrolyte membrane; (c) coating catalyst ink on the electrolyte membrane through the patterns of the mask so as to form a catalyst layer; and (d) removing the masking film layer and the first adhesive layer.

15 Claims, 3 Drawing Sheets

METHOD FOR MANUFACTURING CATALYST-COATED MEMBRANE USING MASK

This application claims the benefit of the filing date of Korean Patent Application Nos. 10-2005-0096800 and 10-2005-0096804, filed on Oct. 14, 2005 and Oct. 14, 2005, respectively in the Korean Intellectual Property Office, the disclosure of which are incorporated herein in their entirety by reference.

TECHNICAL FIELD

The present invention relates to a method for manufacturing a catalyst-coated membrane using a mask and a fuel cell including the catalyst-coated membrane manufactured by the method.

BACKGROUND ART

Fuel cell is a device for generating electricity by using hydrogen or methanol as fuel and oxygen or air as an oxidizer, and by using electron generated during an oxidation-reduction reaction.

Such a fuel cell has a configuration in which an anode and a cathode are formed at both sides of an electrolyte membrane made of a polymer. This configuration is referred to as a Membrane Electrode Assembly (MEA). Hydrogen or Methanol used as fuel is supplied to the anode and reacts upon electrode catalyst to generate hydrogen ion $H^+$, while the hydrogen ion $H^+$ passing through a polymer electrolyte membrane is coupled with oxygen in the cathode so as to generate pure water.

With fuel cell, forming the anode and cathode on the polymer electrolyte membrane can be classified into two methods.

First, electrodes can be formed on a gas diffusion layer by coating catalyst ink on the gas diffusion layer, i.e. a carbon paper or carbon cloth with porosity. Next, a membrane-electrode assembly is manufactured by heating and pressing the electrolyte membrane and the gas diffusion layer coated on electrodes. The membrane-electrode assembly manufactured by such a method lacks contact of the electrolyte membrane to the catalyst layer, thereby causing the increasing of interfacial resistance.

Second, catalyst ink is coated on the surface of a membrane so as to form electrodes on an electrolyte membrane. In this method, the ionic contact of the electrolyte membrane and the catalyst layer is secured in comparison with the first method, so as to improve the capability of the fuel cell. However, this method makes it difficult to manufacture the fuel cell. Various kinds of methods such as spraying, painting, patch coating and screen printing have been developed in order to coat the catalyst ink on the surface of the membrane. However, these methods make the speed of manufacturing fuel cell slow. During the manufacturing of fuel cell, a great amount of solvent in the catalyst ink may cause the membrane to swell, thereby changing the size of the membrane. Thus, it may be difficult to manufacture preferable electrode.

On the other hand, one or more protecting film layers may be added on the catalyst coated membrane in order to handle the product more conveniently and prevent injury to the membrane. Since the exposed region of the polymer electrolyte membrane on which the catalyst is not coated in the catalyst-coated membrane may absorb moisture in the atmosphere and expand, it is difficult to assemble a stack when the membrane-electrode assembly using the catalyst-coated membrane is applied to a stack. Therefore, a protecting film layer is coated on the exposed region of the membrane to increase the mechanical stability of the membrane-electrode assembly made by the catalyst-coated membrane, thereby preventing injury to the membrane and facilitating the stack assembly.

According to the conventional art, separate processes are required to solve the above-mentioned problem. Specifically, the catalyst layer is formed on both surfaces of the polymer electrolyte membrane. Then, the protecting film is coupled to the exposed region of the membrane by heating and pressing the protecting film, or attached to the membrane by an adhesive. However, since the conventional art requires a number of processes such as a catalyst coating process and a protecting film coating process, etc, there is a problem in that it takes much time to perform the processes.

DISCLOSURE OF THE INVENTION

Accordingly, the present invention has been made to solve the above-mentioned problems occurring in the prior art, and it is an object of the present invention to provide a method for manufacturing a catalyst-coated membrane, in which a mask including a masking film layer and a first adhesive layer laminated on the masking film layer, and having patterns in which portions corresponding to the portions of an electrolyte membrane to be coated with catalyst are removed, is attached to an electrolyte membrane, and a catalyst is coated on the electrolyte membrane, thereby preventing swelling of the electrolyte membrane to be caused by coating the catalyst on desired portions of the membrane.

It is another object of the present invention to provide a method for manufacturing a catalyst-coated membrane, in which catalyst can be coated on a desired region of the membrane by using a mask, which additionally includes a protecting film layer and a second adhesive layer sequentially laminated on the first adhesive layer, thereby preventing swelling of an electrolyte membrane which may be caused during the coating of the catalyst, and conveniently forming a protecting film layer on an exposed portion of the electrolyte membrane on which the catalyst is not coated, without a separate operation of coating a protecting film.

It is still another object of the present invention to provide a catalyst-coated membrane manufactured by the method, and a fuel cell including a catalyst-coated membrane manufactured by the method.

In order to accomplish these objects of the present invention, according to an aspect of the present invention, there is provided a method for manufacturing a catalyst-coated membrane, which includes the steps of:

(a) providing a mask including a masking film layer and a first adhesive layer laminated on the masking film layer, and having patterns in which portions corresponding to the portions of an electrolyte membrane to be coated with catalyst are removed;

(b) attaching the mask to one surface or both surfaces of the electrolyte membrane;

(c) coating catalyst ink on the electrolyte membrane through the patterns of the mask so as to form a catalyst layer; and (d) removing the masking film layer and the first adhesive layer.

In the method, the mask may additionally include a protecting film layer and a second adhesive layer which are sequentially laminated on the first adhesive layer.

In order to accomplish these objects of the present invention, according to another aspect of the present invention, there is provided a catalyst-coated membrane manufactured by the method and a fuel cell including a catalyst-coated membrane manufactured by the method.

In order to accomplish these objects of the present invention, according to still another aspect of the present invention, there is provided a mask for catalyst-coating of an electrolyte membrane, which includes: a masking film layer; and a first adhesive layer laminated on the masking film layer, wherein the mask can be attached to the electrolyte membrane, and prevent the electrolyte membrane from swelling. In the mask, a protecting film layer and a second adhesive layer which are sequentially laminated on the first adhesive layer may be included.

In order to accomplish these objects of the present invention, according to still another aspect of the present invention, there is provided a complex for catalyst-coating of an electrolyte membrane, which includes: an electrolyte membrane; and a mask including a masking film layer and a first adhesive layer laminated on the masking film layer, and having patterns in which portions corresponding to the portions of the electrolyte membrane to be coated with catalyst are removed, wherein the mask is attached to one surface or both surfaces of the electrolyte membrane.

In the complex, the mask may additionally include a protecting film layer and a second adhesive layer which are sequentially laminated on the first adhesive layer.

BRIEF DESCRIPTION OF THE DRAWINGS

The foregoing and other objects, features and advantages of the present invention will become more apparent from the following detailed description when taken in conjunction with the accompanying drawings in which.

MODE FOR CARRYING OUT THE INVENTION

Figure 1:
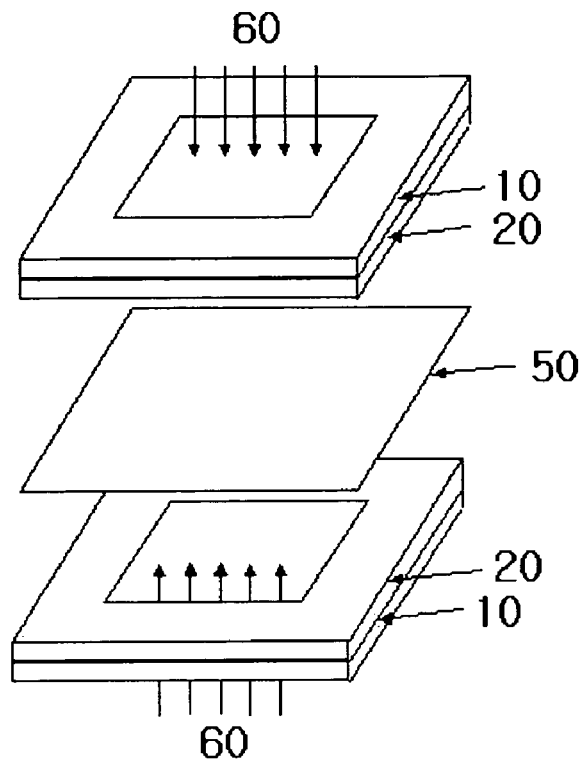
FIG. 1 is a view illustrating processes for manufacturing a catalyst-coated membrane according to an embodiment of the present invention.

Hereinafter, the present invention will be described in detail with reference to the accompanying drawings.

Generally, when catalyst ink is directly coated on an electrolyte membrane, the electrolyte membrane is swelled by solvent in the catalyst ink, and thereby the size of the membrane is changed, resulting in irregular catalyst coating. As a result, it is difficult to manufacture a preferred electrode. Therefore, in order to prevent the swelling of the electrolyte membrane when the catalyst is coated on the membrane, separate supporters are used for the electrolyte membrane.

However, in the method of preparing the catalyst-coated membrane according to the present invention, since a mask including a masking film layer and a first adhesive layer laminated on the masking film layer, and optionally including a protecting film layer and a second adhesive layer sequentially laminated on the first adhesive layer, is attached to the electrolyte membrane and then catalyst is coated on the electrolyte membrane, it is possible to prevent the swelling of the electrolyte membrane without a separate supporter for electrolyte membrane. Specifically, the mask used for preparing the catalyst-coated membrane of the present invention plays the role as a supporter for the electrolyte membrane as well as a simple mask.

Accordingly, the mask of the present invention is used for coating catalyst on the electrolyte membrane and formed by laminating the first adhesive layer on the masking film, which can be attached to the electrolyte membrane and prevent the electrolyte membrane from swelling. Further, in the mask of the present invention, a protecting film layer and a second adhesive layer which are sequentially laminated on the first adhesive layer may be included. And the mask has patterns in which portions corresponding to the portions of the electrolyte membrane to be coated with catalyst are removed.

Specifically, the mask of the present invention plays the role as a mask when the catalyst is coated on the electrolyte membrane, so as to make coating preferably carried out in a predetermined region.

Further, the mask is formed by laminating the first adhesive layer on the masking film layer. At this time, the first adhesive layer provides appropriate adhesiveness between the masking film layer and the electrolyte membrane. The masking film layer plays the role as a supporter which prevents the membrane from twisting and swelling and maintains the shape of the membrane.

Specifically, if the masks are attached to both surfaces of the electrolyte membrane, the masks increase supporting force as supporters preventing the swelling of the electrolyte membrane during the coating of the catalyst. Therefore, according to the preparing method of the present invention, it is possible to prevent the swelling of the electrolyte membrane during the coating of the catalyst, thereby facilitating coating the catalyst on the electrolyte membrane. Thus, it is possible to manufacture excellent electrodes.

On the other hand, in the case where the protecting film layer and the second adhesive layer are sequentially laminated on the first adhesive layer, the thickness of the first adhesive layer is adjusted so that the first adhesive layer has a little adhesiveness. Thus, the first adhesive layer plays the role of maintaining the appropriate adhesiveness between the masking film layer and the protecting film layer. The thickness of the second adhesive layer is adjusted so that the second adhesive layer has intensive adhesiveness, thereby maintaining the intensive adhesiveness between the protecting film layer and the electrolyte membrane. Thus, the masking film layer and the protecting film layer play the role as supporters which can prevent the membrane from twisting and swelling and maintain the shape of the membrane.

If the mask formed by sequentially laminating the masking film layer, the first adhesive layer, the protecting film layer, and the second adhesive layer is used for the method of the present invention, the first adhesive layer constructing the mask can be easily separated from the protecting film layer along with the masking film layer after the catalyst is coated since the first adhesive layer has the adjusted thickness so as to maintain the low adhesiveness. On the other hand, the second adhesive layer can allow the protecting film layer to adhere to the electrolyte membrane because the thickness of the second adhesive layer is adjusted so that the second adhesive layer has the intensive adhesiveness. Thus, without a separate operation of coating a protecting film, the protecting film layer can be easily coated on an exposed portion of the electrolyte membrane on which the catalyst is not coated.

Further, by coating the protecting film layer on the exposed portion of the electrolyte membrane, the electrolyte membrane can be protected from pressure, impact, and heat. In addition, wear and complete dryness of the electrolyte membrane can be prevented. Furthermore, it is possible to improve the mechanical stability of the membrane-electrode assembly made by the catalyst-coated membrane, thereby preventing injury to the membrane and facilitating the stack assembly.

FIG. 1 is a view illustrating processes for manufacturing a catalyst-coated membrane according to an embodiment of the present invention.

As shown in FIG. 1, in order to manufacture the catalyst-coated membrane of the present invention, the mask is formed with patterns in which portions corresponding to those of the membrane to be coated with catalyst are removed, and in which the first adhesive layer 20 is laminated on a masking film layer 10.

The removal of the portions corresponding to those of the membrane to be coated with the catalyst can be carried out by punching the mask in a die.

Next, the mask is attached to one surface or both surfaces of the electrolyte membrane 50 so that the first adhesive layer 20 of the mask is located on the electrolyte membrane 50.

Thus, it is possible to manufacture a complex used for coating the catalyst on the electrolyte membrane, which is made of a mask and an electrolyte membrane, in which the mask includes a masking film layer and a first adhesive layer laminated on the masking film layer, and has patterns in which portions corresponding to the portions of the electrolyte membrane to be coated with catalyst are removed, and in which the mask is attached to the electrolyte membrane so that the first adhesive layer of the mask is located on one surface or both surfaces of the electrolyte membrane. FIG. 1 shows the complex formed by sequentially laminating the masking film layer-the first adhesive layer-the electrolyte membrane-the first adhesive layer-the masking film layer after attaching the mask to both surfaces of the electrolyte membrane.

The catalyst ink 60 is coated on the patterns of the mask attached to one surface or both surfaces of the electrolyte membrane so as to form the catalyst layer. FIG. 1 illustrates processes for forming the catalyst layer on both surfaces of the electrolyte membrane.

After the catalyst layer is formed, the masking film layer 10 and the first adhesive layer 20, which have been attached to one surface or both surfaces of the electrolyte membrane, are removed together, thereby manufacturing the membrane in which the catalyst is coated on one surface or both surfaces of the electrolyte membrane 50.

Figure 2:
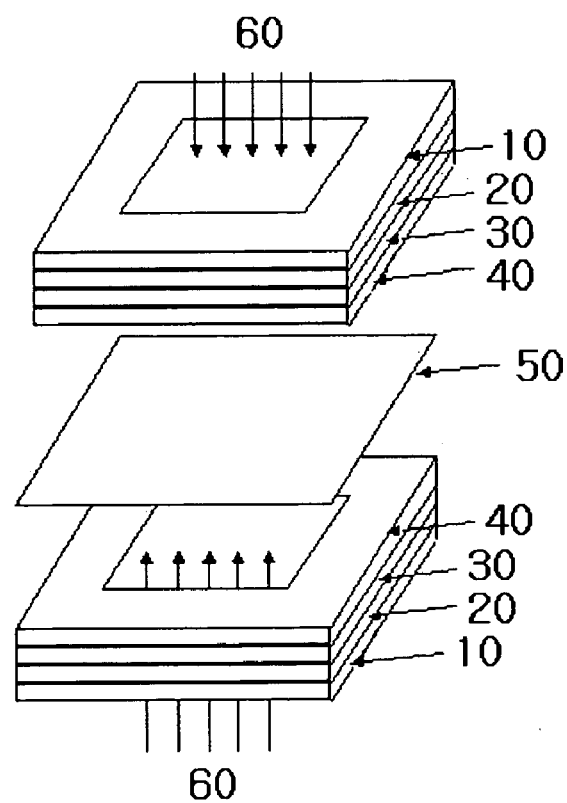
FIG. 2 is a view illustrating processes for manufacturing a catalyst-coated membrane according to another embodiment of the present invention, in which the catalyst-coated membrane has a protecting film layer.

FIG. 2 is a view illustrating processes for manufacturing a catalyst-coated membrane according to another embodiment of the present invention, in which the catalyst-coated membrane has a protecting film layer.

As shown in FIG. 2, in order to prepare the catalyst-coated membrane of the present invention, the mask is formed by sequentially laminating the masking film layer 10, the first adhesive layer 20, the protecting film layer 30, and the second adhesive layer 40 and with patterns in which portions corresponding to those of the membrane to be coated with catalyst are removed.

Next, the mask is attached to one surface or both surfaces of the electrolyte membrane 50 so that the second adhesive layer 40 of the mask is located on the electrolyte membrane 50.

Thus, it is possible to manufacture a complex used for coating the catalyst on the electrolyte membrane, which is made of a mask and an electrolyte membrane, in which the mask includes a masking film layer, a first adhesive layer laminated on the masking film layer, a protecting film layer laminated on the first adhesive layer and a second adhesive layer laminated on the protecting film layer, and has patterns in which portions corresponding to the portions of the electrolyte membrane to be coated with catalyst are removed, and in which the second adhesive layer of the mask is located on one surface or both surfaces of the electrolyte membrane. FIG. 2 shows processes for the complex in which the mask is attached to both surfaces of the electrolyte membrane.

The catalyst ink 60 is coated on the patterns of the mask attached to one surface or both surfaces of the electrolyte membrane so as to form the catalyst layer. FIG. 2 illustrates processes for forming the catalyst layer on both surfaces of the electrolyte membrane.

After the catalyst layer is formed, the masking film layer 10 and the first adhesive layer 20, which have been attached to one surface or both surfaces of the electrolyte membrane, are removed, thereby manufacturing the catalyst-coated membrane in which the protecting film layer is formed. As shown in FIG. 2, it is possible to manufacture the catalyst-coated membrane in which the protecting film layer 30 is attached to both surfaces of the electrolyte membrane 50.

According to the present invention, the masking film layer may be made of at least one material selected from a group of polyethyleneterephthalate, polyethylenenaphthalate, polyester, polyethylene, polypropylene, polycarbonate, polyamide, polyphenylenesulfide and polyimide.

The masking film with a thickness of 10 to 150 micrometers may be used. Preferably, the masking film with a thickness of 40 to 80 micrometers may be used. If the thickness of the masking film layer is less than 10 micrometers, supporting force for preventing the swelling of the electrolyte membrane becomes small, thereby making it difficult to coat the catalyst on the electrolyte membrane. On the other hand, the more the thickness of the masking film layer increases, the more the supporting force also increases. However, if the thickness of the masking film layer exceeds 150 micrometers, it is difficult to attach the mask to the electrolyte membrane.

Further, according to the present invention, the first adhesive layer may be made of at least one material selected from a group of silicon resin, acryl resin, urethane resin, epoxy resin and rubber. Preferably, the first adhesive layer may be made of silicon resin in view of heat-resistance and chemical stability.

The first adhesive layer with a thickness of 2 to 50 micrometers may be used. Preferably, the first adhesive layer with the thickness of 2 to 20 micrometers may be used. If the thickness of the first adhesive layer is less than 2 micrometers, it is easy to remove the masking film layer after the coating process is performed. However, it is difficult to maintain the adhesiveness between the electrolyte membrane and the masking film layer. Thus, there is a disadvantage in that it is difficult to obtain a clear end surface. On the other hand, if the thickness of the first adhesive layer exceeds 50 micrometers, the adhesiveness is too strong, thereby causing damage in the electrolyte membrane when the first adhesive layer is removed.

In the case of sequentially laminating the protecting film layer and the second adhesive layer on the first adhesive layer, the second adhesive layer may be made of identical material or different material with the first adhesive layer. Specifically, the second adhesive layer may be made of at least one material selected from a group consisting of silicon resin, acryl resin, urethane resin, epoxy resin and rubber. Preferably, the second adhesive layer is made of silicon resin in view of heat-resistance and chemical stability.

Further, in the case of sequentially laminating the protecting layer and the second adhesive layer on the first adhesive layer, the first adhesive layer with a thickness of 2 to 50 micrometers may be used. Preferably, the first adhesive layer with the thickness of 2 to 20 micrometers may be used. The first adhesive layer is required to have a small amount of adhesiveness because the masking film layer should be easily removed after the catalyst is coated on the electrolyte membrane. If the thickness of the first adhesive layer is less than 2 micrometers, it is difficult to maintain appropriate adhesiveness between the first adhesive layer and the protecting film layer during the coating of the catalyst. Thus, there is a disadvantage of failing to obtain a clear protecting film layer. On the other hand, if the thickness of the first adhesive layer exceeds 50 micrometers, the adhesiveness is too strong. Therefore, there is a problem in that the protecting film layer can be damaged when the first adhesive layer is removed after the coating process.

The second adhesive layer with a thickness of 2 to 50 micrometers may be used. Preferably, the second adhesive layer with the thickness of 10 to 30 micrometers may be used. The second adhesive layer plays the role of attaching the protecting film layer to the electrolyte membrane. If the thickness of the second adhesive layer is less than 2 micrometers, supporting force for preventing the swelling of the electrolyte membrane becomes small. On the other hand, the more the thickness of the second adhesive layer increases, the more supporting force increases. If the thickness of the second adhesive layer is about 50 micrometers, the swelling of the electrolyte membrane can be sufficiently prevented. Preferably, the second adhesive layer has a thickness equal to or less than about 50 micrometers.

According to the present invention, the protecting film layer may be made of at least one material selected from a group of polyethyleneterephthalate, polyethylenenaphthalate, polyester, polyethylene, polypropylene, polycarbonate, polyamide, polyphenylenesulfide and polyimide.

The protecting film layer with a thickness of 10 to 150 micrometers may be used. Preferably, the protecting film layer with the thickness of 20 to 50 micrometers may be used. If the thickness of the protecting film layer is less than 10 micrometers, the protecting film layer is too thin. Thus, the protecting film layer can be easily torn and the supporting force of the protecting film layer becomes small. If the thickness of the protecting film layer exceeds 150 micrometers, the protecting film layer may have a thickness thicker than that of the catalyst layer formed by coating the catalyst, thereby causing the contact of the catalyst layer and the gas diffusion layer to be weakened.

In the present invention, if the thickness of the masking film layer is thin, the supporting force for preventing the swelling of the electrolyte membrane is weakened. In order to compensate for this, the thickness of the first adhesive layer increases over a certain value. In the case of increasing the thickness of the first adhesive layer, when the masking film layer and the first adhesive layer are removed after the catalyst is coated, the electrolyte membrane may be damaged. Therefore, a mask with a total thickness of about 30 to 200 micrometers, preferably 80 to 100 micrometers, may be used.

In the case of the mask in which the protecting film layer and the second adhesive layer are sequentially laminated on the first adhesive layer, a very small amount of first adhesive layer is necessary. If the second adhesive layer has the thickness larger than a certain value, the second adhesive layer allows the protecting film layer to be well attached to the electrolyte membrane. Thus, the thickness of the masking film layer and the protecting film layer can be adjusted in consideration of working efficiency and the supporting force. Further, the total thickness of the mask may be determined in view of the thickness of the catalyst layer formed by coating the catalyst.

In the present invention, a polymer electrolyte membrane can be used as the electrolyte membrane. The electrolyte membrane may be made of at least one material selected from a group of perfluorosulfonic acid polymer, hydrocarbon-based polymer, polyimide, polyvinylidenefluoride, polyethersulfone, polyphenylenesulfide, polyphenyleneoxide, polyphosphazene, polyethylenenaphthalate, polyester, doped polybenzimidazole, polyetherketone, polysulfone, and acid thereof or base thereof.

In the present invention, the coating of the catalyst can be achieved by directly coating the catalyst ink. At this time, the method of coating the catalyst ink is not limited to a specific method, but includes spray coating, tape casting, screen-printing, blade coating, die coating and spin coating, etc.

The catalyst ink may consist of catalyst, polymer ionomer, and a solvent.

Available catalyst materials include Platinum black catalyst, Platinum-Ruthenium Black catalyst, platinized Carbon catalyst, Platinum-Ruthenium/Carbon catalyst, Platinum-Molybdenum black catalyst, Platinum-Molybdenum/Carbon catalyst, Platinum-Rhodium black, Platinum-Rhodium/Carbon catalyst, and Platinum-based alloy catalyst.

Preferably, the Platinum-Ruthenium or Platinum-Ruthenium/Carbon may be used as the catalyst for the anode, and Platinum or platinized Carbon may be used as the catalyst for the cathode.

The catalyst particles may be dispersed in carbon particles, or include the Platinum or alloy black.

The polymer ionomer provides ions with a pathway so that the ions generated by reaction of fuel such as hydrogen or methanol with the catalyst move to the electrolyte membrane, and for example includes Nafion ionomer and sulfonated polymer such as polytriplefluorostylene sulfonate, but is not limited thereto.

Preferably, the ratio of the polymer ionomer is within a range of 5 to 30 parts by weight per catalyst of 100 parts by weight. If the polymer ionomer is less than 5 parts by weight, the ion transferring pathway is not normally formed in the catalyst layer and thereby ions formed by the catalyst reaction cannot be smoothly moved. On the other hand, if the polymer ionomer exceeds 30 parts by weight, the ionomer covers the catalyst layer and thereby the fuel cannot easily react upon the catalyst.

Available solvents include water, butanol, iso propanol, methanol, ethanol, n-propanol, n-butyl acetate, and ethylene glycol, etc. Each or a mixture of these materials can be used as the solvent. It is prefer to use an identical solvent for the anode and the cathode.

Preferably, the ratio of the solvent in the catalyst ink is about 100 to 5000 parts by weight per the catalyst of 100 parts by weight. If the amount of the solvent is less than 100 parts by weight, the viscosity of the catalyst ink increases too much. When the catalyst is coated, the dispersion of the catalyst particles is degraded and thereby it is difficult to form a uniform catalyst layer. On the other hand, if the amount of the solvent exceeds 5000 parts by weight, the viscosity of the catalyst ink decreases too much. The thickness of the catalyst to be coated is too thin and thereby the coating is repeated several times. It causes a reduction of productivity.

The catalyst, the polymer ionomer, and the solvent, etc. may be mixed by using a high speed mixer, a mechanical stirrer, or a sonicator, so that catalyst slurry in which the catalyst particles are uniformly dispersed may be manufactured.

When the catalyst layer is formed, the catalyst layer may be dried within a range of a temperature of 20 to 90° C., preferably 25 to 30° C.

In the present invention, the catalyst layer preferably has a thickness of about 1 to 60 micrometers. If the thickness of the catalyst layer is less than 1 micrometer, the catalyst layer is irregularly formed to cause lack of catalyst. Thereby, the durability can be reduced. If the thickness of the catalyst layer exceeds 60 micrometers, the catalyst layer is too thick. Thereby, it is difficult to diffuse gas in the catalyst layer so that the reaction of gas upon the catalyst layer becomes slow.

The catalyst-coated membrane manufactured by the method of the present invention is used to form the membrane-electrode assembly. Specifically, a gas diffusion layer may be adopted to the catalyst-coated membrane.

Materials used for the fuel cell can be used as materials for the gas diffusion layer, which includes carbon fabric, non-woven carbon fabric, carbon cloth, and carbon paper, etc. However, the materials are not limited thereto. The gas diffusion layer may be treated to have hydrophobicity. If necessary, the materials may additionally include a carbon black micro layer and a catalyst layer.

The gas diffusion layer can be formed on the catalyst-coated electrolyte membrane by using a conventional method well known in this art, for example heat-pressing method.

Further, the fuel cell of the present invention may include the catalyst-coated membrane manufactured according to the present invention. Specifically, the fuel cell may include the membrane-electrode assembly using the catalyst-coated membrane. For example, the fuel cell is made from the membrane-electrode assembly and bipolar plates according to the conventional method well known in this art.

The fuel cell may include a polymer electrolyte membrane fuel cell, a direct methanol fuel cell, a direct formic acid fuel cell, a direct ethanol fuel cell, or a direct dimethylether fuel cell.

EMBODIMENTS

Hereinafter, the embodiments of the present invention will be described to help in understanding the present invention. The description of the following embodiments is merely to help in easily understanding the present invention, and may not intend to limits the scope of the present invention to these embodiments.

Embodiment 1

Manufacturing of Catalyst-Coated Membrane

A masking film layer was formed of polyethyleneterephthalate to have a thickness of 75 micrometers. A first adhesive layer was formed of silicon to have a thickness of 15 micrometers. These two layers were adhered to each other, and then portions (size: 25 Cm$^2$) of the two layers corresponding to the portions of the electrolyte membrane to be coated with the catalyst were punched and removed by a die, so as to manufacture a mask.

A Nafion membrane (NAFION 112), commercially available from DuPont, which was perfluorosulfonic acid polymer was used as an electrolyte membrane. A complex for catalyst-coating of the electrolyte membrane was manufactured by attaching the mask to the electrolyte membrane so that the first adhesive layer was located on both surfaces of the electrolyte membrane.

In order to manufacture the catalyst ink, platinized carbon catalyst was used as the catalyst for an anode and cathode. NAFION solution, iso-propanol, and water were mixed and then the mixture thereof and the catalyst were agitated. At this time, catalyst, NAFION dry weight, and solvent were mixed in the ratio of 1:0.3:20. Next, they were agitated so as to be dispersed well. Then, the mixture thereof was uniformly mixed by the high-speed mixer for 2 hours, so as to manufacture catalyst ink.

The catalyst ink was sprayed on the portion of the mask corresponding to the portions of the electrolyte membrane to be coated with the catalyst by using a spray coater, so that catalyst layers of 0.4 mg/cm$^2$ were formed on both surfaces, i.e. anode and cathode, of the electrolyte membrane, respectively. Then, a solution made by mixing the NAFION and iso-propanol in a ratio of 1:1 was coated on the surface of the catalyst layer. Finally, the masking film layer and the first adhesive layer, which had been attached to both surfaces of the electrolyte membrane, were removed from the electrolyte membrane, resulting in production of the catalyst-coated membrane of the present invention shown in FIG. 3.

Figure 3:
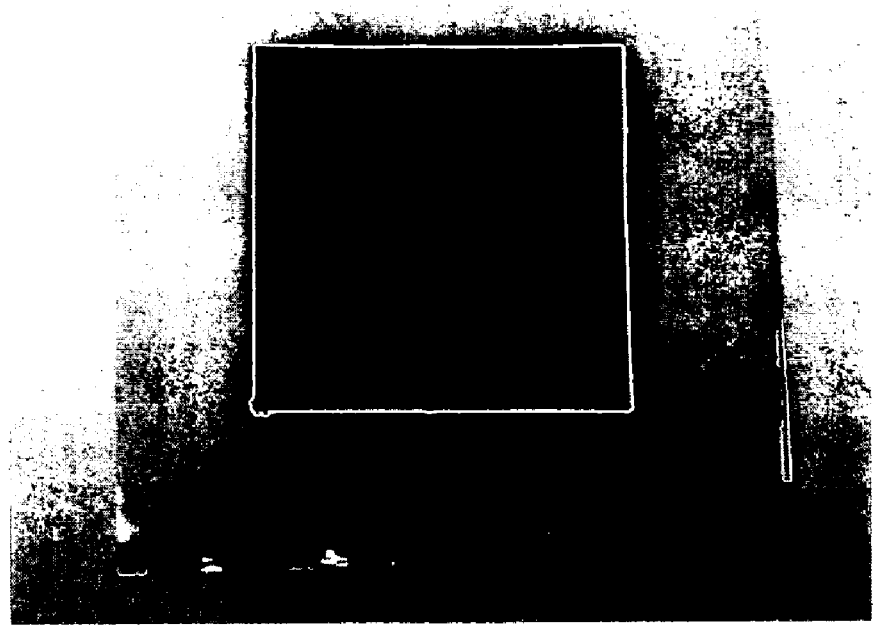
FIG. 3 is a photograph showing a catalyst-coated membrane which is manufactured according to the first embodiment of the present invention.

Unlike the conventional method in which the catalyst ink was coated on the electrolyte membrane for a long time while the electrolyte membrane was fixed by a tool in order to prevent the electrolyte membrane from swelling, in the catalyst-coated membrane manufactured according to the first embodiment of the present invention, the catalyst ink was rapidly and clearly coated on the electrolyte membrane while the mask with viscosity restrained the swelling of the electrolyte membrane, as shown in FIG. 3.

Embodiment 2

Manufacturing of Catalyst-Coated Membrane

A masking film layer was formed of polyethyleneterephthalate to have a thickness of 50 micrometers. A first adhesive layer was formed of silicon to have a thickness of 4 micrometers. A protecting film layer was made of polyimide to have a thickness of 25 micrometers. A second adhesive layer was formed of silicon to have a thickness of 10 micrometers. These four layers were sequentially adhered to one another, and then portions (size: 25 cm$^2$) of the four layers corresponding to portions of the electrolyte membrane to be coated with catalyst were punched and removed by a die.

A Nafion membrane (NAFION 112), commercially available from DuPont, which was perfluorosulfonic acid polymer was used as an electrolyte membrane. A complex for the catalyst-coating of the electrolyte membrane was manufactured by attaching the mask to the electrolyte membrane so that the second adhesive layer was located on both surfaces of the electrolyte membrane.

Then, the processes of manufacturing the catalyst ink, coating the catalyst ink and removing the masking film layer and the first adhesive layer were carried out by the same method as those of the first embodiment. The catalyst-coated membrane, in which the protecting film layer of the present invention was coated on edges on which the catalyst was not coated, was manufactured.

Figure 4:
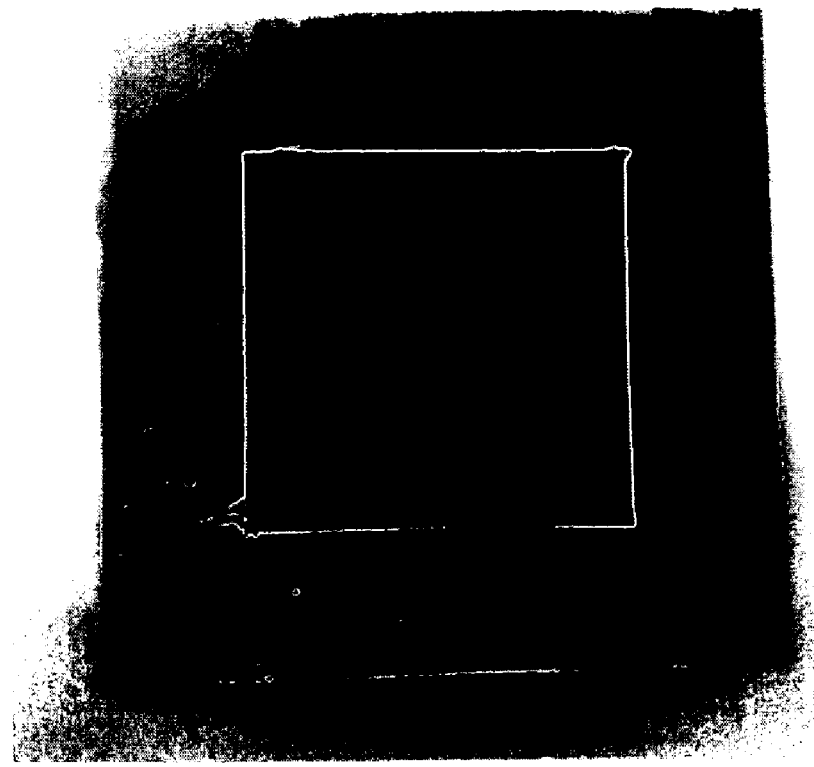
FIG. 4 is a photograph showing a catalyst-coated membrane with a protecting film layer, which is manufactured according to the second embodiment of the present invention.

Unlike the conventional method in which the catalyst ink was coated on the electrolyte membrane for a long time while the electrolyte membrane was fixed by a tool in order to prevent the electrolyte membrane from swelling and a protecting film layer was coated by heat-pressing on edges on which the catalyst was not coated, in the catalyst-coated membrane manufactured according to the second embodiment of the present invention, the catalyst ink was rapidly and clearly coated on the electrolyte membrane while the mask with viscosity restrained the swelling of the electrolyte membrane as shown in FIG. 4. Further, it was unnecessary to coat a separate protecting film on the electrolyte membrane. Thus, coating of the catalyst on the electrolyte membrane could be easily carried out.

Embodiment 3

Manufacturing of Membrane-Electrode Assembly and Unit Cell Using the Catalyst-Coated Membrane A gas diffusion layer (a carbon paper treated to have hydrophobicity), commercially available from SGL company, was adopted to both surfaces of the catalyst-coated membrane manufactured according to the first embodiment, and then the catalyst-coated membrane was applied to a polymer electrolyte membrane fuel cell. In order to maintain gas tightness around the membrane-electrode assembly, a gasket with a thickness of 300 μm came into close contact with polymer electrolyte except for the electrode. Then, an anode plate with a pathway for providing uniform pressure and through which hydrogen was introduced, and a cathode plate for providing uniform pressure and through which air was introduced, came into close contact with the membrane-electrode assembly, so as to manufacture a unit cell.

Embodiment 4

Manufacturing of Membrane-Electrode Assembly and Unit Cell Using the Catalyst-Coated Membrane The membrane-electrode assembly and unit cell were manufactured by the same method as that of the third embodiment, excepting that the catalyst-coated membrane manufactured in the second embodiment was used instead of the catalyst-coated membrane manufactured in the first embodiment.

Embodiment 5

Measuring of Capability of Unit Cell

The potential change of unit cell, which were manufactured in the embodiments 3 and 4, was measured according to current density. The results were shown in FIGS. 5 and 6, respectively. The measurement was carried out under a condition of a cell temperature of 70° C., an operation pressure of 2 bars, and hydrogen/air affection. Stoichiometric coefficients of gases were 1.2 (cathode gas) and 1.4 (anode gas).

Figure 5:
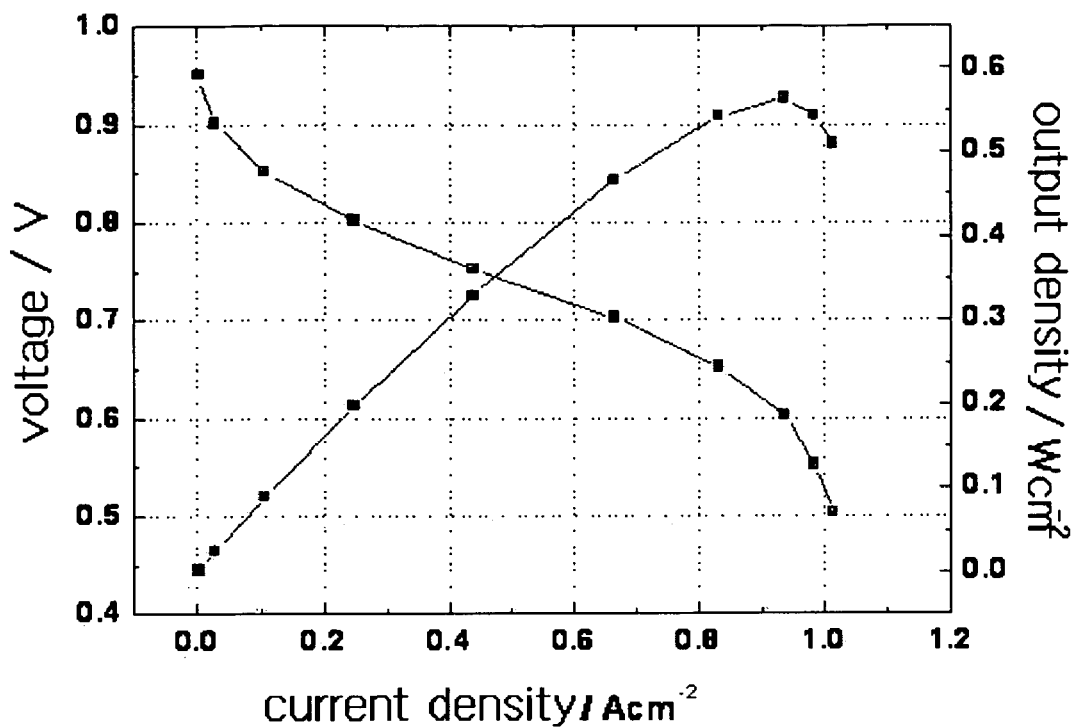
FIG. 5 is a graph illustrating a potential change of unit cell depending on current density in a PEMFC manufactured according to the third embodiment of the present invention.
Figure 6:
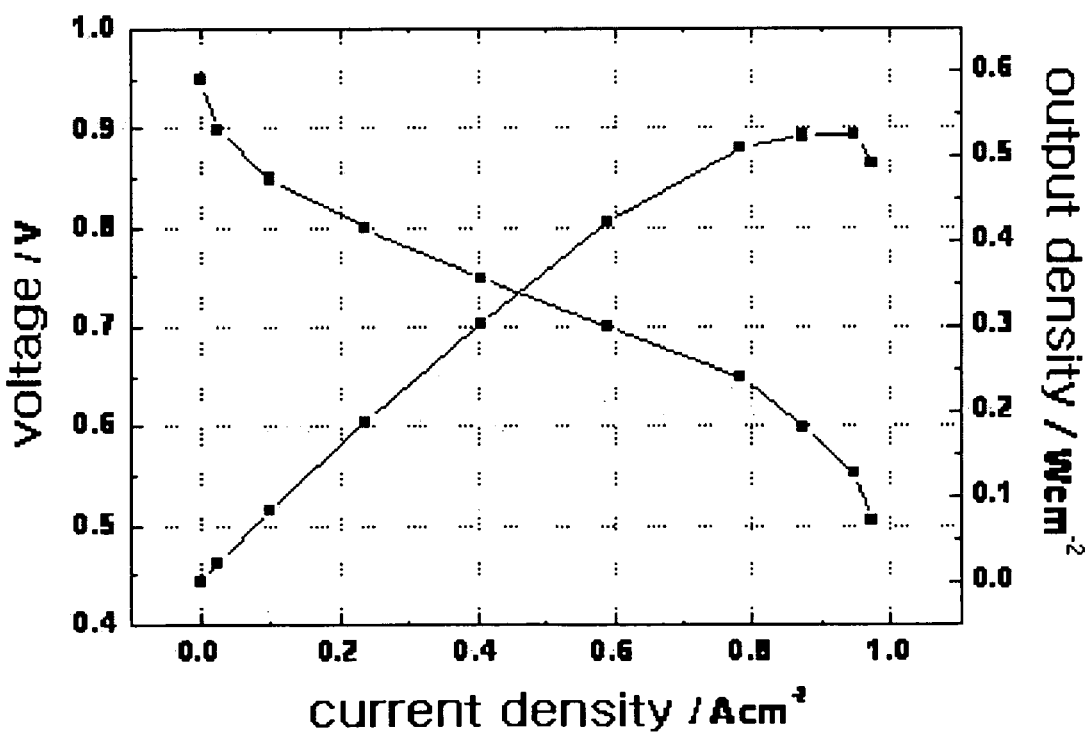
FIG. 6 is a graph illustrating a potential change of unit cell depending on current density in a PEMFC manufactured according to the fourth embodiment of the present invention.

As shown in FIG. 5, the fuel cell employing the catalyst-coated membrane manufactured according to the first embodiment maintained the capability over 0.55 W/cm$^2$ at 0.6V for a long time. As shown in FIG. 6, the fuel cell employing the catalyst-coated membrane manufactured according to the second embodiment maintained the capability over 0.5 W/cm$^2$ at 0.6V for a long time.

INDUSTRIAL APPLICABILITY

According to the present invention, the mask including the masking film layer and the first adhesive layer laminated on the masking film layer, and having patterns in which portions corresponding to the portions of the electrolyte membrane to be coated with catalyst are removed, is attached to the electrolyte membrane, thereby preventing the swelling of the electrolyte membrane occurring when the catalyst is coated. Further, the catalyst-coated membrane is easily formed in desired regions of the electrolyte membrane even though the complicated processes are not carried out. In addition, it is possible to obtain the fuel cell including the catalyst-coated membrane.

Further, according to the present invention using the mask in which the protecting film layer and the second adhesive layer are sequentially laminated on the first adhesive layer, the catalyst-coated membrane to which the protecting film layer is applied can be easily manufactured even though the protecting film is not separately coated on the exposed portions of the electrolyte membrane on which the catalyst is not coated. In addition, it is possible to obtain the fuel cell including the catalyst-coated membrane.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A method for manufacturing a catalyst-coated membrane, the method comprising the steps of:
   (a) providing a mask including a masking film layer, a first adhesive layer, a protecting film layer, and a second adhesive layer, the first adhesive layer, the protecting film and the second adhesive layer being superimposed and sequentially laminated on the masking film layer and having patterns in which portions corresponding to the portions of an electrolyte membrane to be coated with catalyst are removed;
   (b) attaching the mask to one surface or both surfaces of the electrolyte membrane so that the second adhesive layer of the mask is located on the electrolyte membrane;
   (c) coating catalyst ink on the electrolyte membrane through the patterns of the mask so as to form a catalyst layer; and
   (d) removing the masking film layer and the first adhesive layer,
   wherein the protecting film layer has a thickness of 10 to 150 micrometers.

2. The method as claimed in claim 1, wherein the masking film layer is made of at least one material selected from a group of polyethyleneterephthalate, polyethylenenaphthalate, polyester, polyethylene, polypropylene, polycarbonate, polyamide, polyphenylenesulfide and polyimide.

3. The method as claimed in claim 1, wherein the masking film layer has a thickness of 10 to 150 micrometers.

4. The method as claimed in claim 1, wherein the first adhesive layer is made of at least one material selected from a group of silicon resin, acryl resin, urethane resin, epoxy resin and rubber.

5. The method as claimed in claim 1, wherein each of the first adhesive layer and the second adhesive layer is made of at least one material selected from a group of silicon resin, acryl resin, urethane resin, epoxy resin and rubber.

6. The method as claimed in claim 1, wherein the first adhesive layer has a thickness of 2 to 50 micrometers.

7. The method as claimed in claim 1, wherein each of the first adhesive layer and the second adhesive layer has a thickness of 2 to 50 micrometers.

8. The method as claimed in claim 1, wherein the protecting film layer is made of at least one material selected from a group of polyethyleneterephthalate, polyethylenenaphthalate, polyester, polyethylene, polypropylene, polycarbonate, polyamide, polyphenylenesulfide and polyimide.

9. The method as claimed in claim 1, wherein the mask has a total thickness of 30 to 200 micrometers.

10. The method as claimed in claim 1, wherein the electrolyte membrane is made of at least one material selected from a group of perfluorosulfonic acid polymer, hydrocarbon-based polymer, polyimide, polyvinylidenefluoride, polyethersulfone, polyphenylenesulfide, polyphenyleneoxide, polyphosphazene, polyethylenenaphthalate, polyester, doped polybenzimidazole, polyetherketone, polysulfone, and acid thereof or base thereof.

11. A catalyst-coated membrane manufactured by the method as claimed in claim 1.

12. The catalyst-coated membrane as claimed in claim 11, wherein the mask includes a protecting film layer and a second adhesive layer which are sequentially laminated on the first adhesive layer.

13. A fuel cell including a catalyst-coated membrane manufactured by the method as claimed in claim 1.

14. The fuel cell as claimed in claim 13, wherein the mask includes a protecting film layer and a second adhesive layer which are sequentially laminated on the first adhesive layer.

15. The fuel cell as claimed in claim 13, wherein the fuel cell includes a polymer electrolyte membrane fuel cell, a direct methanol fuel cell, a direct formic acid fuel cell, a direct ethanol fuel cell, or a direct dimethylether fuel cell.

* * * * *

UNITED STATES PATENT AND TRADEMARK OFFICE
CERTIFICATE OF CORRECTION

PATENT NO. : 8,163,442 B2  
APPLICATION NO. : 11/546359  
DATED : April 24, 2012  
INVENTOR(S) : Seong Min Song et al.

Page 1 of 1

It is certified that error appears in the above-identified patent and that said Letters Patent is hereby corrected as shown below:

On the Title Page:

At item (73), please replace "Assignee: LG Chem, Ltd., Seoul (KR)" with "Assignee: LG Chem., Ltd., Seoul (KR) and LG Electronics, Inc., Seoul (KR)."

Signed and Sealed this  
Seventh Day of October, 2014

Michelle K. Lee  
*Deputy Director of the United States Patent and Trademark Office*